E. HINMAN.
Churn.
No. 39,529.
Patented Aug. 11, 1863.
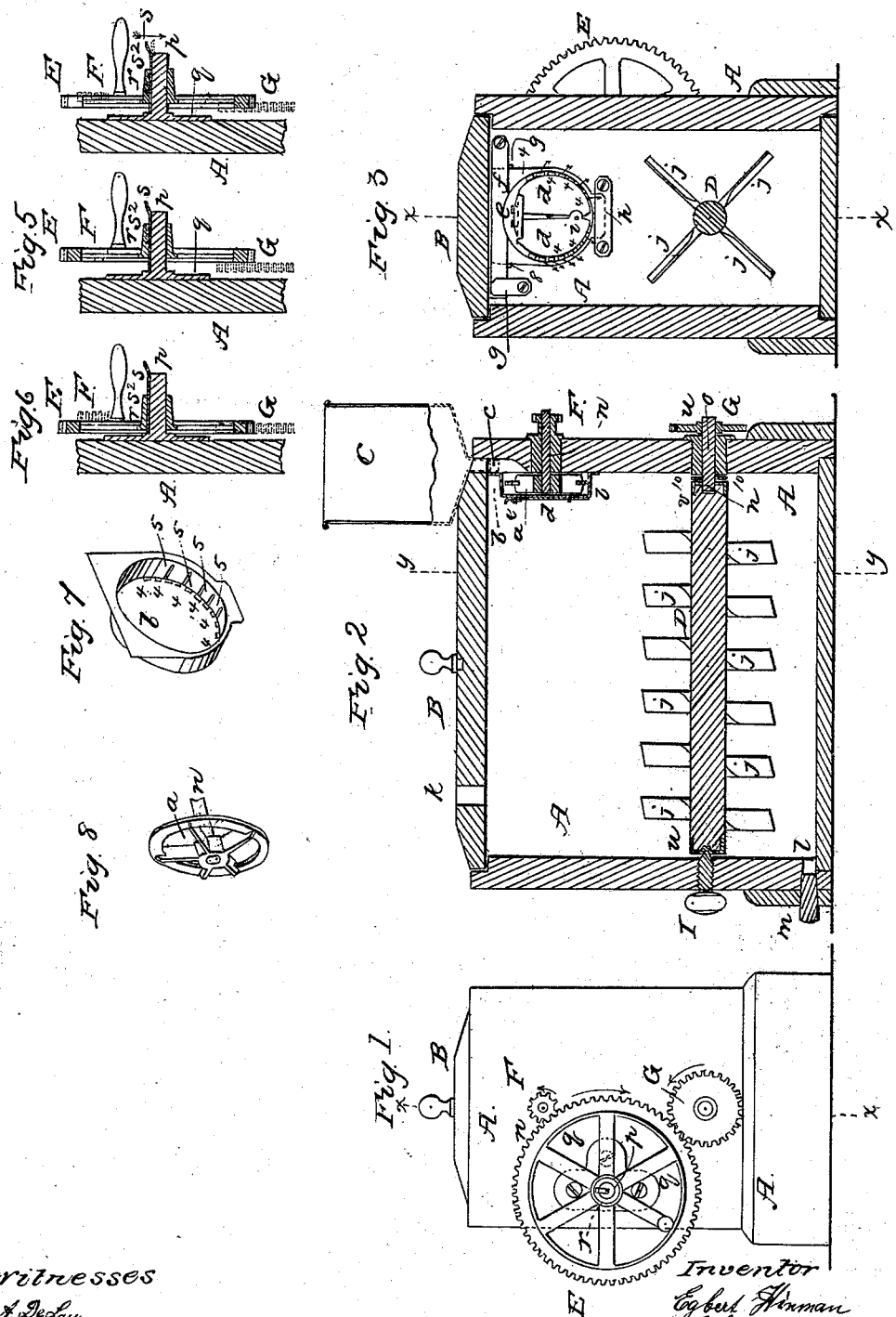

UNITED STATES PATENT OFFICE.

EGBERT HINMAN, OF SYRACUSE, ASSIGNOR TO JOHN RANKIN, OF HOMER NEW YORK.

IMPROVEMENT IN CHURNS.

Specification forming part of Letters Patent No. 39,529, dated August 11, 1863.

*To all whom it may concern:*

Be it known that I, EGBERT HINMAN, of Syracuse, of the county of Onondaga, in the State of New York, have invented certain new and useful Improvements in Churns; and I do hereby declare that the following is a full and exact description thereof, reference being had to the accompanying drawings, making part of this application.

My invention relates to that kind of churn in which the cream from which the butter is to be made is fed from a funnel-like receptacle into a mechanism for breaking the globules containing the butter, and thence to a rotating dasher for completing the operation by which butter is produced.

My invention has for its objects to produce the greatest possible quantity of butter in the least time, from a given quantity of cream, with the simplest kind of mechanism, and to so construct and combine the several parts of the apparatus that their adjustment may be very easily effected without any complication of mechanism; and to these ends my invention consists in the employment of a peculiarly-constructed rotating wheel, arranged within a case having variable discharge-openings and through which the cream passes, all as hereinafter more fully explained; and my invention further consists in hanging the main driving-gear upon a stationary stud in such a manner that it may be shifted horizontally and made to mesh with either the pinion on the shaft of the rotating wheel (or primary dasher) or the pinion on dasher-shaft, or with both, at the pleasure of the operator, as will be more fully described hereinafter; and my invention further consists in arranging the exit for the discharge of the buttermilk at the opposite end of the churn from that at which the cream enters, in connection with a screw-like dasher, by which the mass and particles of butter may be effectually withdrawn from that end of the churn where the buttermilk is drawn off, to prevent the escape of any particles of butter, as will be more fully explained.

To enable those skilled in the art to make and use my invention, I will now proceed to describe the construction and operation of one of my improved churns, referring by letters and figures to the accompanying drawings, in which—

Figure 1 is an end elevation of one of my improved churns. Fig. 2 is a vertical longitudinal section at the line $x\,x$, Fig. 1. Fig. 3 is a vertical cross-section at the line $y\,y$, Fig. 2. Figs. 4, 5, and 6 are similar detail sectional views, illustrating the adjustment of the main driving-gear. Fig. 7 is a perspective view of the metallic case, which retains or incloses the rotating wheel, through which the cream first passes; and Fig. 8 is a perspective view of said wheel.

In the several figures the same part of the machine will be found designated by the same letter of reference.

A is the box or case of the churn, which I have shown of rectangular form and provided with a suitable cover or removable top, B. At one end and on top of the churn may be placed a suitable vessel, C, which is supplied with the cream, and which is formed with a nozzle or funnel-shaped spout to admit of its contents being discharged through the channel $c$ into the case $b$. (See Fig. 2.)

D is the main dasher-shaft, which is arranged longitudinally in the box A, as shown, in suitable bearings, and is driven through the medium of a spur-pinion, G, in a manner which will be presently described. On this shaft D are arranged a series of radial dashers or arms, $j$, in four rows, longitudinally equi-distant in a cross-section, and so shaped and placed relatively as to constitute together, when rotating, a screw-feeder as well as a dasher. The shaft D (with its arms or wings $j$) is provided at its ends with two metallic cap-pieces, $v$ and $w$. In the latter of these caps is a conical seat or bearing for the taper end of the screw I, on which one end of shaft D runs. The other cap, $v$, is pierced with a square or other polygonal hole, in which fits the square portion K of the shaft or stud $o$, which constitutes the other journal of the shaft D, and on which is made fast the pinion G.

The peculiar construction just described will be clearly seen at Fig. 2, where it will be observed that the shaft $o$ is arranged and has its bearing in a metallic bushing, $u$, secured in the side of the box A, the said shaft $o$ being made with a thin collar, 10, which bears against the inner face of said bushing $u$ when the shaft D is pushed longitudinally by feeding in the taper screw I. Immediately over one end of the shaft D, and near the top of the churn, is hung a small dasher-wheel or globule-breaker, $a$. This wheel $a$ is hung on a shaft, $n$, which has its bearing in the metallic bushing $t$, and which is furnished with a spur-pinion, through which it derives a rotary motion, as will be presently explained. This wheel $a$ is of a peculiar shape, as clearly shown in Figs. 2 and 8, and is inclosed between the side of box A and a cylindrical removable case, $b$. This case $b$ (clearly seen at Figs. 2 and 7) is made with numerous apertures near the perimeter of its circular face, through which the cream fed into said case is allowed to escape, and these apertures 4 4 4, &c., have their capacity or size varied at pleasure by the adjustment of two plates, $d\ d$, which are hung near one end on a pivot, $i$, and retained or held against the surface of case $b$ by a bar, $e$, under which they slide freely. The case $b$ is so constructed and arranged with the retaining loops or straps $g$ and $h$ and the hinged bar $f$ and pins 8 9 as that it can be readily removed and replaced by the operator. The shaft $n$ is driven by a pinion, F, which, as well as the pinion G, is driven by main driving-gear E. In the end or side of the box A opposite to that where the cream enters is made an exit or discharge orifice, $l$, which is provided with a suitable plug or stopper, $m$, and through which the buttermilk is drawn off. The main driving-gear E is provided with a suitable crank-handle, and is mounted so as to turn freely on a stationary stud, $p$. This stud $p$ has a longitudinal slot or groove cut in it, (of variable depths,) in which is arranged a spring-bar, $s$, fastened at one end to said stud $p$, (see Figs. 4, 5, 6,) and provided with a small lug or projection, $s^2$. On the interior or bearing surface of the hub $r$ of the main gear E are cut three annular grooves, each one of which is adapted to accommodate the lug $s^2$ of the spring or clutch bar $s$, and it will be understood that while this lug $s^2$ will retain the hub $r$ in a given position longitudinally on the stud $p$ it will not interfere with the rotation of said hub on said stud, (on account of the annular groove into which the lug $s^2$ passes and fits comparatively loosely.)

In Figs. 4, 5, and 6 the hub $r$ (the gear E) is shown in the three different positions in which it may be rotated on its stud $p$, the lug $s^2$ being in a different groove of the hub $r$ in each different position of the gear E. In these three figures of the drawings the pinions F and G are drawn in red lines to illustrate the different connections with them of the gear E in its various adjustments. At Fig. 4 it will be observed that the gear E meshes (during a part of its face) into the pinion F, and also into the pinion G, so that it drives both of said pinions. At Fig. 5 it will be seen that the gear E meshes only with the pinion F and drives it, and not the pinion G, while at Fig. 6 the gear E is shown in mesh with only the pinion G. Since the hub $r$ is retained longitudinally on the stud $p$ by the lug $s^2$, it is obvious that by pressing down the outer end of bar $s$ (in the direction indicated by the red arrow, Fig. 4) said lug $s^2$ will be disengaged from the hub $r$, which latter may be then slid along until the lug $s^2$ comes opposite to another annular groove, into which the spring-bar $s$ will throw it when relieved or released from pressure.

The operation of my improved churn will be readily understood from a brief explanation in connection with the foregoing. The cream from which butter is to be churned is put into the vessel C, from which it flows down through the passage $c$ to the interior of case $b$ and onto the wheel $a$. This wheel $a$, rotating rapidly within the case $b$, by its peculiar formation, assisted by the projecting bars 5 5 (see Fig. 7) of the case $b$, tends to agitate the cream extremely, and the minute globules, which contain particles of butter, are so rapidly and infinitely deflected from one surface to another of the wheel and case that they are burst or broken up, and the disengaged particles of butter, together with the liquid matter, make their escape through the holes 4 4 4, &c., of the case $b$, and the whole falling down into the box A, as indicated by the arrows at Fig. 2, is agitated by the wings $j$ of the main dasher, which rotates more slowly than the wheel $a$, and the particles of butter are collected and massed together by said wings $j$, as before mentioned. The said wings are so shaped and arranged on shaft D' as to constitute, when in motion, not only a dasher but also a screw-feeder, which can be made to feed the mass or particles of solid matter in either direction by turning the driving gear in different directions, so that the operator can work the particles of butter away from that end of the box at which the cream enters and congregate or mass them toward the opposite end of said box, or can feed the mass of butter and loose particles away from that end where the exit $l$ is, to draw off the buttermilk without loss of butter, or can work the butter backward and forward in the box after the buttermilk is drawn off.

I am aware of churns being in use in which a dasher is employed which will feed the butter along as a screw in only one direction, and do not wish my invention in this respect to be confounded with such kind of churns.

When it is desired to draw off the buttermilk, or any part of it, the direction of motion of the driving-gear is reversed—that is, the operator turns the crank-handle backward—which reverses the motion of the screw-like dasher, which then feeds the mass of butter and loose particles away from that end where it had collected them, and thus permits the escape of the liquid through the orifice $l$ without allowing the particles of solid matter to pass out.

It will be understood that the register-plates $d\ d$ of the case $b$ are adjusted by the operator to vary the capacity of the exits 4 4, according to the quality or fluidity of the cream or milk from which butter is being churned by the apparatus.

It has already been explained how the gear E is shifted at pleasure to drive either one of the pinions F and G, or both, and it will be understood that this adjustment effects the driving of either the wheel $a$ or the main dasher-shaft D separately, or both together, at the will of the operator. A sufficient quantity of atmospheric air may be afforded to the interior of the box A by a simple hole, $k$, in the lid. (See Fig. 2.)

Having fully described the construction and operation of my improved churn, what I claim therein as new, and desire to secure by Letters Patent, is—

1. The employment of the preliminary dasher $a$, constructed as described, in combination with the case $b$, provided with a register for varying the capacity of the discharge-apertures, the whole arranged and operating as set forth.

2. Regulating the capacity of the apertures through which the liquid and solid mass escapes from the case $b$, as and for the purpose described.

3. Making the driving-gear E adjustable on its shaft, as described, in combination with the clutching device or its equivalent, whereby the driving-gear may be adjusted to run in mesh with either one or both of the dasher-pinions, as and for the purposes set forth.

In testimony whereof I have hereunto set my hand and seal this 4th day of April, 1863.

EGBERT HINMAN. [L. S.]

In presence of—
J. HURST,
SAML. HURST.